United States Patent

Lehovec et al.

[15] 3,670,198

[45] June 13, 1972

[54] SOLID-STATE VIDICON STRUCTURE

[72] Inventors: Krut Lehovec; Frank H. Hielscher, both of Williamstown, Mass.; Horst M. Freier, Vienna, Austria

[73] Assignee: Sprague Electric Company, North Adams, Mass.

[22] Filed: Sept. 30, 1969

[21] Appl. No.: 862,338

[52] U.S. Cl. ....315/11, 313/65 AB

[51] Int. Cl. ....H01j 31/48

[58] Field of Search ....313/65 AB; 315/11

[56] References Cited

UNITED STATES PATENTS

| | | | |
|---|---|---|---|
| 3,474,285 | 10/1969 | Goetzberger | 313/65 AB |
| 3,403,278 | 9/1968 | Rahng et al. | 313/65 AB |
| 3,419,746 | 12/1968 | Crowell et al. | 313/65 AB |
| 3,440,477 | 4/1969 | Crowell et al. | 313/65 AB |
| 3,523,208 | 8/1970 | Boomer et al. | 313/65 AB |

*Primary Examiner*—Benjamin A. Borchelt
*Assistant Examiner*—N. Moskowitz
*Attorney*—Connolly & Hutz, Vincent H. Sweeney, James Paul O'Sullivan and David R. Thornton

[57] ABSTRACT

A charge storage vidicon camera structure is provided by covering a thin semiconductor wafer with a semi-insulating layer. A spacial optical pattern is projected onto this photoelectrically active material and transformed into a time sequence of electrical codes which can be subsequently reconverted into an optical image.

21 Claims, 8 Drawing Figures

SOLID-STATE VIDICON STRUCTURE

BACKGROUND OF THE INVENTION

This invention relates to vidicon structures and more particularly to a silicon surface junction/resistor photosensing device consisting of a silicon substrate covered by an amorphous semi-insulating film or wide band gap semiconductor.

Vidicon devices are presently used primarily for television cameras. These vidicon devices are rather expensive and are sold in comparatively small quantities. However, there is a forthcoming very large market in view-phones and this application will provide for the mass production of relatively inexpensive devices.

For prior art vidicon devices the classical means of access is achieved by deflecting an electron beam over the $x$–$y$ plane of the light sensitive target, thus providing a spacially continuous representation of the optical image. In order to avoid flicker, the electron beam has to return to the same target area element in about 1/30 of a second or faster. If the target is made of discrete sensing elements, a sensing pattern consisting of discrete information bits is obtained. Typically, about $10^5$ discrete sensing elements are required.

The advent of solid state technology has led to efforts to replace electron beam access by solid state access. Typically, the solid state scanning device contains two sets of electrodes. Each set of electrodes consists of a large number of parallel line contacts. Each line of one set is orthogonal to each line of the other set, forming an orthogonal $x$ and $y$ coordinate line system. The light sensitive target elements are located at the crossing points between these coordinate lines. This type of scanning results in a number of discrete image points, each point corresponding to a crossover of coordinate lines. The various image points are addressed by a voltage pulse applied in sequence to the $x$–lines, and another voltage pulse applied in sequence to the $y$–lines, the rate of shift of the voltage pulses being such that all $y$–lines are addressed once, while the pulse is connected to a given $x$–line. The photoelectric sensing element at the crossover of an $x$ and a $y$ line is activated when the pulse is applied to the $x$ as well as to the $y$ line.

A typical solid state access vidicon contains several hundred thousand discrete sensing elements. Since all these elements must be addressed in about 1/30 of a second or less to avoid flicker, the addressing time of a given element is of the order of a tenth of a microsecond.

One of the basic difficulties in vidicon manufacturing consists of the extremely high degree of uniformity required for all sensing elements. A single bad element among the $10^5$ elements leads to a visible defect in the reproduced picture which is usually not tolerable.

The P-N junction in silicon is particularly attractive as a sensing element, because it satisfies the basic requirements of photoconductivity, high dark resistance and low capacitance, and large RC–time constant in the dark. In addition its technology is highly developed. Moreover, it can be integrated by microcircuit technology with the electronic signal processing required for the access pulses and subsequent signal amplification. Difficulties of this approach arise by crowding of the isolation junctions and photosensitive junctions in the narrow space of only about 1 mil between adjacent elements.

Further deficiencies of present structures in use are: (a) the high degree of processing control required to prepare the P-N junction islands uniformly, (b) the fact that the structure is not readily adaptable to solid state scanning; and (c) the fact that the structure is not readily adaptable to continuous electron beam scanning.

It is therefore the main object of the present invention to overcome the above deficiencies.

SUMMARY OF THE INVENTION

Broadly the present invention is concerned with a structure for conversion of illumination into an electrical signal and more particularly refers to a semiconducting substrate overlaid by a semi-insulator together with means of forming a depletion layer in the substrate and means for passing an electrical signal through the semi-insulator and substrate.

N-type silicon may serve as the semiconducting substrate and amorphous films of insulators or wide band gap semiconductors (for instance, $Si_3N_4$ or SiC) as the semi-insulating layers.

The amorphous films are insulating at low electric fields but conducting at high electric fields (Poole-Frenkel Effect); therefore, electrical charge in the form of electrons on the surface of such films cannot spread sideways but can flow through the film if the voltage drop across the film is sufficiently high. However, the electron flow through the semi-insulating film to the overlying electrode is also controlled by the depletion layer in the N semiconductor substrate. At low voltages, the current is limited by the thin insulating film; at higher voltages by the leakage (generation) current in the semiconductor depletion layer. This leakage current increases when light is shined on the semiconductor slice.

In operating conditions, for the case of electron beam access the exposed film surface will be charged to the cathode potential which is selected sufficiently negative with respect to the semiconductor substrate that the current through the film is controlled by the hole generation current in the semiconductor depletion layer. In the dark, this leakage current is small so there is little discharge in the typical television scan time of 1/30 second. The target elements which are struck by light will lose their charge by the increased leakage current. When the scanning electron beam returns to an element which was discharged by light during the previous scanning cycle, it recharges this element to cathode potential which causes a signal in the external circuit.

From the above, it is seen that the entire area of the device acquires the required photosensitive characteristic eliminating the processing hitherto required to prepare uniform P-N junctions. Also, sensitivity in the present invention is not restricted to P-N junction areas but is homogeneous over the whole device area.

When discrete sensing elements are desired, a grid structure blocking current flow may be added between the semiconductor substrate and impinging electron beam. The vidicon structure can be adapted for solid state access by overlaying the discrete sensing elements with metal contacts and providing discrete access paths to the sensing elements in the substrate.

DETAILED DESCRIPTION OF THE INVENTION

Figure 1:
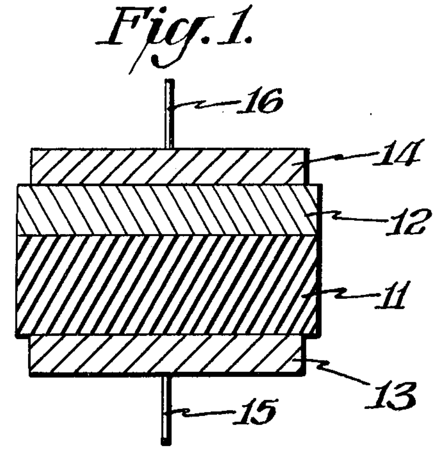
FIG. 1 shows one embodiment of the semi-insulating structure of the invention.

Referring to FIG. 1, a vidicon structure according to the invention is formed by covering a semiconductor base wafer 11 with a semi-insulating layer 12 and attaching electrodes 13 and 14 to their respective surfaces. Leads 15 and 16 are attached to metal electrodes 13 and 14 respectively. For these particular embodiments a semi-insulator is a material having a conductivity which increases with electric field so that when an electric field is perpendicular to the surface of the semi-insulator, there is conduction perpendicular to the surface with high insulation parallel to the surface of said semi-insulator due to low fields. Film 12 becomes conducting at high fields since current increases about exponentially with the field in the semi-insulator.

The semi-insulator resistance is in series with the resistance of the silicon surface depletion-inversion layer which forms when the semi-insulator is biased negatively against an N–type silicon substrate or positively against a P-type silicon substrate. When the field across the semi-insulator is small, the resistance of the structure is essentially that of the semi-insulator, and the surface depletion-inversion layer is in quasithermal equilibrium, i.e., its potential drop is less than the forbidden band gap (about one volt) and the C–V characteristic is that of an ordinary MOS structure at high frequencies. When the dc potential substrate 11 and metal contact 14 is increased, the leakage current through the semi-insulator becomes sufficiently large that the surface depletion-inversion layer is no longer in quasi-thermal equilibrium, but is driven into "deep depletion". This means that a larger potential drop develops across the depletion layer, it widens and its capacitance thus decreases, until the leakage current through the widened depletion layer matches the current through the semi-insulator. The leakage current through the depletion layer is known to be sensitive to illumination of wavelengths sufficiently short to generate electron hole pairs in silicon ($\lambda \leq 1.1$ microns).

Figure 2:
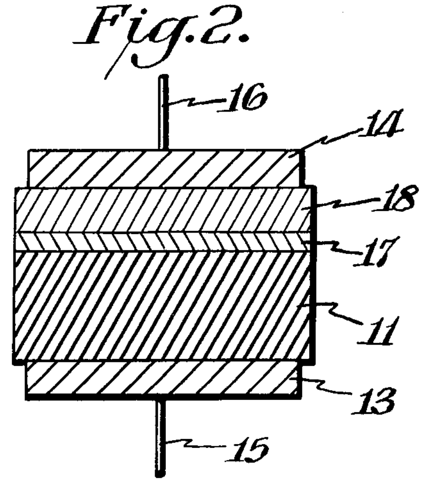
FIG. 2 shows an alternate embodiment of the structure of FIG. 1.

Sufficiently low leakage currents can be obtained with N-type silicon used for substrate 11 of FIG. 1 and silicon nitride ($Si_3N_4$) or silicon dioxide ($SiO_2$) used as the semi-insulating layer 12. However, $Si_3N_4$ and $SiO_2$ are not the preferred semi-insulators because of potentially destructive breakdown effects. A preferred semi-insulator is silicon carbide (SiC) through which considerably larger current densities can be passed before destructive breakdown. FIG. 2 shows an alternate embodiment of the invention wherein a layer 17 of $Si_3N_4$ approximately 20 to 500 A units thick has been sandwiched between the silicon substrate 11 and a 2000 A units thick layer 18 of SiC. This embodiment maintains the excellent interface properties of the $Si/Si_3N_4$ combination while utilizing the preferred properties of the SiC. The resistance of the comparatively thin $Si_3N_4$ is sufficiently low to avoid its breakdown, while the comparatively large SiC resistance has the primary effect on the vidicon operation.

The above-described structures have the important property that the semi-insulator combines lateral isolation with perpendicular conduction, where lateral and perpendicular refer to directions parallel and orthogonal, respectively, to the wafer surface. This property results from the small thickness of the semi-insulator film compared with the lateral spacing of discrete sensing elements in vidicons, which is in the $10^{-3}$ cm range. Thus, by geometrical considerations alone, i.e., with a semi-insulator of a resistivity which is independent of field, large lateral-to-perpendicular resistance ratios would be expected. In semi-insulators whose resistance follows the Schottky or Frenkel-Poole laws, the effect is tremendously enhanced by the fact that perpendicular fields are much larger than lateral fields, for reasons related to the same geometrical dimensions mentioned previously and the perpendicular film conductivity increases accordingly compared to the lateral film conductivity.

The structures of FIGS. 1 and 2 can be used for continuous scanning by electron beam. In such use, the metal electrode 14 and lead 16 in FIG. 1 and FIG. 2 are omitted in order to permit access by the electron beam.

Figure 3:
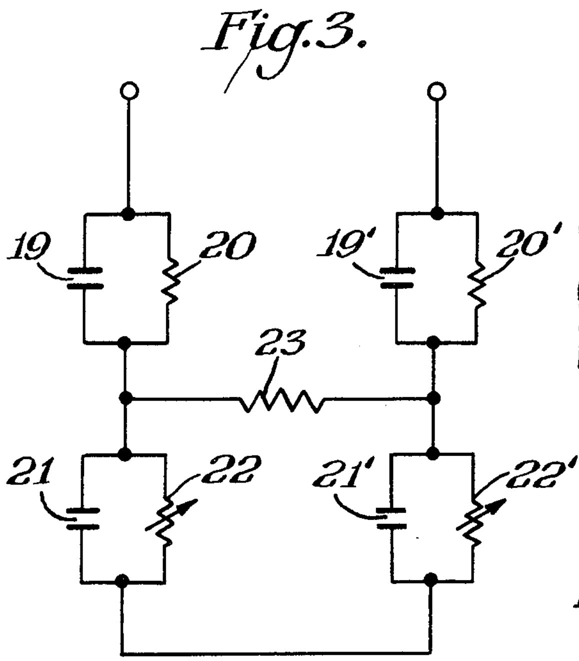
FIG. 3 shows an equivalent circuit for two adjacent area elements of the structures of FIGS. 1 and 2.

An equivalent circuit for the semiconductor-semi-insulator structures of FIGS. 1 and 2 without electrode 16 and lead 14 is shown in FIG. 3 for two adjacent area elements. Capacitances 19, 19′ ($C_{SI}$) and resistances 20, 20′ ($R_{SI}$) refer to the capacitance and resistance of the semi-insulator; $C_d$ 21, 21′ and $R_d$ 22, 22′ refer to the capacitance and resistance of the depletion layer. Only $C_{SI}$ is a constant (more or less) while $R_{SI}$, $C_d$ and $R_d$ depend on voltage and/or current. The depletion resistor $R_d$ depends on illumination which is indicated by the arrow symbol. A cross coupling between adjacent area elements may occur by means of the charge in an inversion layer at the semiconducting surface, indicated by the inversion layer resistance 23 ($R_I$).

There are various modes of operation of out vidicon structure. One preferred mode of charge storage in the charging regime operates as follows: during access by the electron beam, the surface of the semi-insulator is charged negatively by impinging electrons until it takes on the potential of the cathode emitting the beam and the electron beam is repelled. This charges the $C_{SI} - C_d$ combination of the capacitances of the semi-insulator and depletion layer in the semiconductor. During the non-access period of about 1/30 second, the capacitance discharges and the surface of the semi-insulator becomes less negative. The degree of discharge depends on the leakage current through the semiconductor depletion layer which can be considered as a current generator, $I_s$. The current $I_s$ corresponds to the saturation current of a reverse biased P-N junction and increases with illumination.

During the next electron beam access, the surface of the insulator is recharged negatively until its potential is again that of the cathode, and the charge required depends on $I_s$ and, therefore, on illumination. A video signal pulse in proportion to the illumination level is thus obtained.

An alternative means of providing an electrical signal from an illuminated sensing element comprises the depletion capacitance of the element in a tuned electric circuit whose frequency of tuning is responsive to the capacitance of the depletion layer.

The lateral resolution of the here-described structure may be limited if an inversion layer should form at the semi-insulator/silicon interface. The interface conductivity arising from this inversion layer would connect adjacent area elements as shown in FIG. 3 by the resistor $R_I$, 23.

Figure 4:
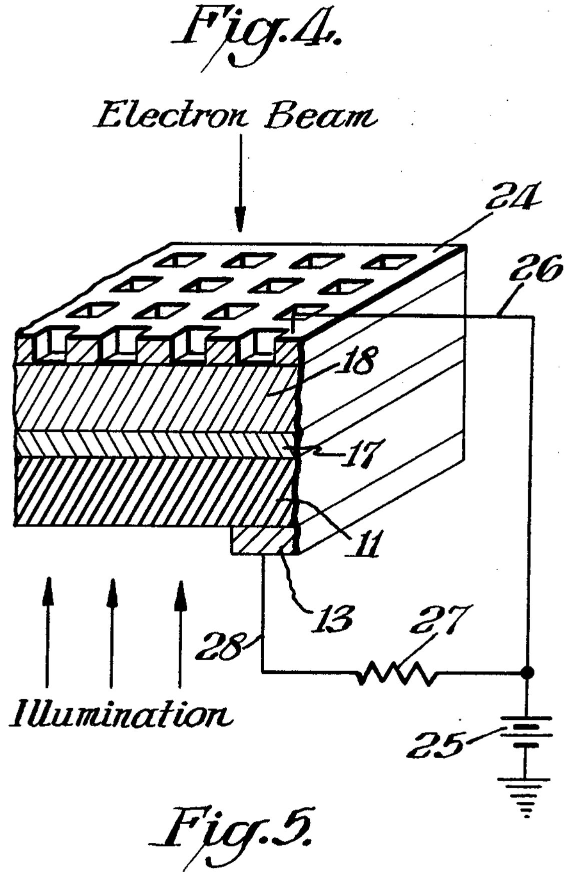
FIG. 4 shows a section of a vidicon camera structure adapted for electron beam scanning, utilizing a conducting grid on the outer surface of the semi-insulator.
Figure 5:
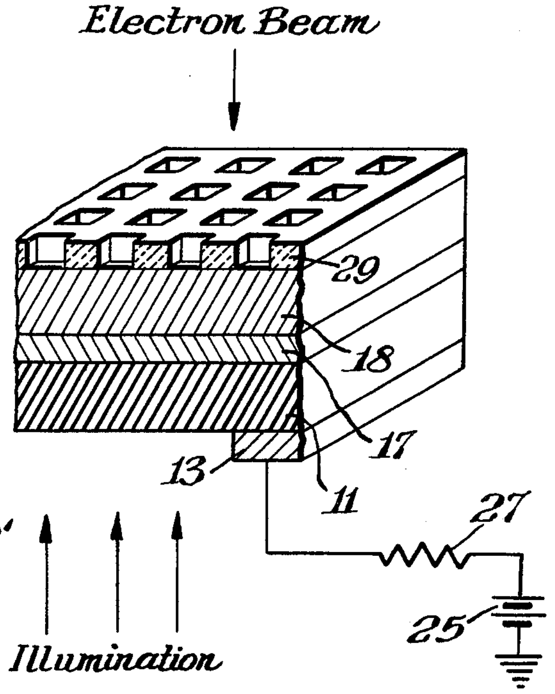
FIG. 5 shows an alternate embodiment of FIG. 4 utilizing an insulating grid instead of a conducting grid.

This inversion layer spreading can be prevented by proceeding to the discrete structure shown in FIGS. 4 and 5. The basic structure remains the same: semi-insulating layer 18 overlaying semi-insulating layer 17 overlaying N-type silicon substrate 11 charged to a positive potential by metal electrode 13. In the structure of FIG. 4 a metal layer grid 24 is placed on top of semi-insulator 18 and has openings for access of the electron beam to the semi-insulator surface. The spread of the inversion layer beyond the individual sensing element can be prevented by a positive bias of grid 24 to substrate 11 as applied by power supply 25, resistor 27 and leads 26 and 28. External bias may be omitted by selecting a semi-insulating material having a sufficiently large positive built-in charge. Examples of such a material are $SiO_2$ or $Si_3N_4$.

An alternate method of preventing the inversion layer spreading is shown in FIG. 5. The basic structure remains the same: semi-insulating layer 18 overlaying semi-insulating layer 17 overlaying N-type silicon substrate 11 and charged to a positive potential by metal electrode 13. In addition an insulating film 29 is deposited onto the semi-insulator film, but is then photo-etched away in holes which provide openings for access of the electron beam to the semi-insulator surface. The remaining portions of the grid prevent the spread of the inversion layer beyond the individual sensing elements by decreasing the field impinging on the semiconductor surface between individual sensing elements. This is due to the thickness of the insulator or preferably, to a positive builtin charge in the insulative film.

Figure 6:
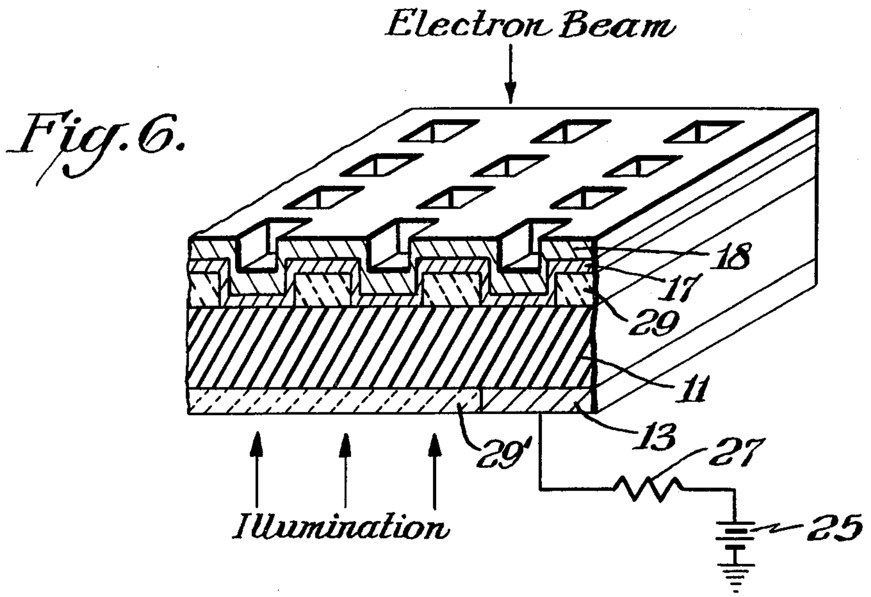
FIG. 6 shows an alternate embodiment of FIG. 5 utilizing an insulating grid between the semiconductor substrate and semi-insulator.

A more practical method for using an insulating grid to prevent inversion layer spreading is shown in FIG. 6. A relatively thick (2000–5000 A) insulating, $SiO_2$, film 29 is thermally grown on both surfaces of N-type silicon substrate 11. The insulating film is next etched away to form a grid structure on one surface which is overlaid with semi-insulative films 17 and 18. The holes in the grid structure provide openings for flow of the impinging electrons to semiconductor substrate 11, while the positive charge in the grid 29 prevents the spread of the inversion layer beyond the individual sensing elements.

The transparent insulative film 29' thermally grown on the opposing surface causes a low surface recombination velocity and therefore under illumination, the surface recombination of photon-generated carriers will be lowered.

A gradient of dopant impurity may be diffused in substrate 11 of the above mentioned structures, with a high dopant concentration in the area of the substrate furthest from semi-insulative film 17 with decreasing concentration towards semi-insulative film 17. This gradient causes an electric field to arise in the N-type substrate, of a polarity which drives photoelectrically generated holes toward the depletion layer adjacent to semi-insulative film 17. This prevents their recombination at the surface opposite the depletion layer.

Figure 7:
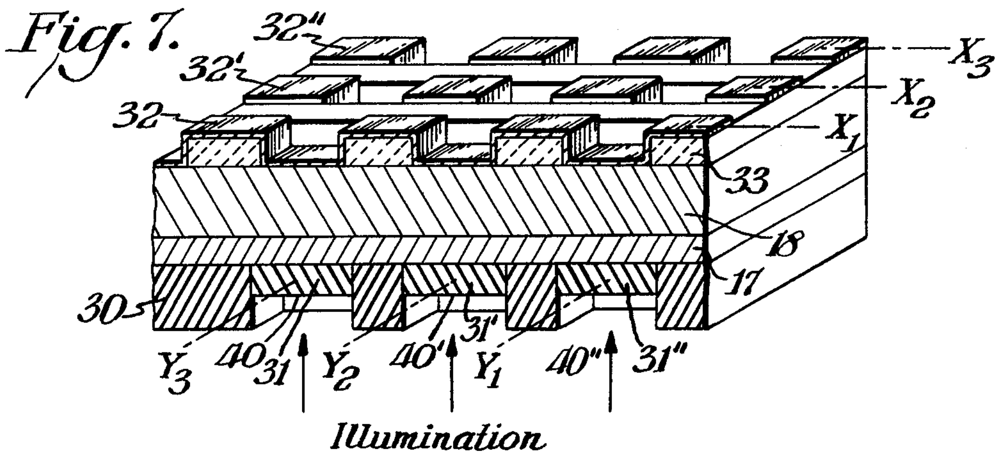
FIG. 7 shows a section of a vidicon camera structure adapted for solid state scanning utilizing an insulating grid on the outer surface of the semi-insulator.

This type of structure lends itself to access by solid state scanning as shown in FIG. 7. Substrate 30 is P-type silicon with N-type diffused channels 31, 31' and 31''. Semi-insulative film 17 consisting of thin $Si_3N_4$ and the thicker semi-insulative film 18 composed of SiC are deposited on top of the diffused channels and substrate. In addition, a relatively thick (5000 A) $SiO_2$ insulative film 33 is deposited onto the semi-insulative film, but is then etched through to form a grid structure with discrete sensing points as shown in FIG. 7 with such openings being narrower than the N-type channels. A set of metal strips 32, 32' and 32'' are then produced by evaporation and photoetching, and running on the top surface, but orthogonal to the original N-channels. The photo-electric sensing elements are at the crossings of the metal strips and the diffused channels.

Portions of the semiconducting substrate 30 have been reduced in thickness as indicated by 40, 40' and 40'' to expose surfaces of the N–type channels 31, 31' and 31'' to the incident illumination. Preferably the portions of reduced thickness are arranged in the manner of openings in a grid structure, whereby the grid structure of the thicker portions of the semiconducting film 30 provides mechanical strength. In a practical structure, the thicker portions can be 2 mils thick, while the thinner portions corresponding to the N-type conductivity channels can be 1 mil thick.

The P-N junctions in the silicon substrate serve as isolation elements and not as photosensitive storage and sensing elements. The photosensitive device is the semi-insulator/silicon channel combination.

Operation proceeds by contacting channel $Y_1$ and switching consecutively from metal strip $X_1$ to $X_2$ to $X_3$ etc. resulting in the video signal due to each element of channel $Y_1$. The signal sampling continues with channel $Y_2$, making consecutive contact to $X_1$, $X_2$, $X_3$ etc.. After the last channel has been sampled, operation returns to $Y_1$.

Figure 8:
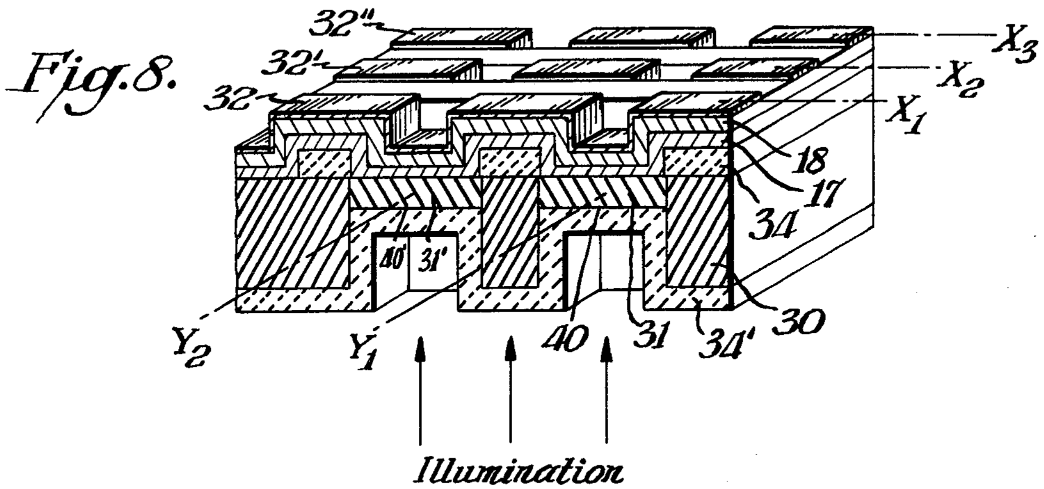
FIG. 8 shows an alternate embodiment of FIG. 7 utilizing an insulating grid interposed between the semiconductor substrate and semi-insulator.

A more practical structure lending itself to access by solid state scanning is shown in FIG. 8. Substrate 30 is P-type silicon with N-type diffused channels 31 and 31'. Next a relatively thick (2000–5000 A) insulating, $SiO_2$ film 34, 34' is thermally grown on both surfaces of substrate 30 and the exposed surfaces of channels 31 and 31'. Insulative layer 34 which has a common interface with channels 31, 31' and substrate 30 is then etched away through discrete sensing points to form a grid structure running along the top of the previously diffused N-type channels with such openings being narrower than the N-type channels. Semi-insulative film 17 consisting of thin $Si_3N_4$ and the thicker semi-insulative film 18 composed of SiC are deposited on top of diffused channels 31, 31' and insulative layer 34. A set of metal strips 32, 32' and 32'' is then produced by evaporation and photoetching, deposited on the outside surface of insulative film 18, and running in a direction orthogonal to the original N-channels. The photo-electric sensing elements are at the crossings of the metal strips and the diffused channels.

Portions of the semiconducting substrate 30 have been reduced in thickness as indicated by 40 and 40' to expose surfaces of the N-type channels 31 and 31' to the incident illumination. Preferably the portions of reduced thickness are arranged in the manner of openings in a grid structure, whereby the grid structure of the thicker portions of the semiconducting film 30 provides mechanical strength. In a practical structure, the thicker portions can be 2 mils thick, while the thinner portions corresponding to the N-type conductivity channels can be 1 mil thick.

Again the P-N junctions in the silicon substrate serve as isolation elements and not as photosensitive storage and sensing elements. The photosensitive device is the semi-insulator silicon island combination.

Operation proceeds by contacting channel $Y_1$ and switching consecutively from metal strip $X_1$ to $X_2$ to $X_3$ etc. resulting in the video signal due to each element of channel $Y_1$. The signal sampling continues with channel $Y_2$ making consecutive contact to $X_1$, $X_2$, $X_3$ etc.. After the last channel has been sampled, operation returns to $Y_1$.

The transparent insulative film 34' thermally grown on the opposing surface has a low recombination velocity and therefore under illumination, the surface recombination of photon-generated carriers would be lowered. A gradient of dopant impurity may be diffused in channels 31 and 31' of the above mentioned structures, with a high dopant concentration in the area of the channel furthest from semi-insulative film 17 with decreasing concentration towards semi-insulative film 17. This gradient causes an electric field to arise in the channels, of a polarity which drives photoelectrically generated holes toward the depletion layer adjacent to semi-insulative film 17. This prevents their recombination at the surface opposite the depletion layer.

Since it is obvious that many changes and modifications can be made in the above-described details without departing from the nature and spirit of the invention, it is to be understood that the invention is not limited to said details except as set forth in the appended claims.

What is claimed is:

1. A structure for conversion of illumination into an electrical signal comprising a silicon semiconducting substrate, a first semi-insulator comprising a material from the group of $SiO_2$, $Si_3N_4$ or a combination thereof, said first semi-insulator having a common interface with said substrate and a thickness in the range between 20 and 500 A, a second semi-insulator of a material different from said group and substantially thicker than said first semi-insulator and overlying said first semi-insulator, means to electrically charge the surface of said second semi-insulator with respect to said substrate causing a depletion layer in said substrate, said electric charge on the surface of said second semi-insulator discharging with time through said underlying semi-insulators and depletion layer, the rate of said discharge increasing with increase in the illumination of said underlying substrate, and means to ascertain the local rate of said discharge by an electrical signal passed in sequence through various sensing points laterally spaced along said interface.

2. The structure of claim 1 in which said means to charge said surface of said second semi-insulator comprises: an electron beam impinging on said surface and scanning the surface of said second semi-insulator in a repetitious manner returning to the same position.

3. The structure of claim 2 in which said means to pass an electrical signal through said semi-insulators and substrate comprises: an electrical circuit which establishes a positive potential of said semiconductor with respect to the cathode emitting said electron beam.

4. The structure of claim 3 wherein said electrical signal comprises: an ac current, the frequency of which depends upon the capacitance of said sensing points.

5. The structure of claim 3 comprising an insulating layer in form of a grid structure overlying said semiconducting substrate, said semi-insulating layers in the openings of said grid structure representing said sensing points.

6. The structure of claim 1 wherein said sensing points are discretely spaced, the spacing of neighboring sensing points being large compared with the combined thickness of said semi-insulators, thereby combining lateral isolation of said sensing points along said semi-insulators with semiconduction perpendicularly through said semi-insulators.

7. The structure of claim 1 in which said semiconducting substrate is of N-type conductivity.

8. The structure of claim 7 comprising a conducting grid structure deposited on the outside surface of said second semi-insulator shielding said second semi-insulator from charging by the electron beam except that the openings of said grid structure and preventing the flow off of the impinging electrons through said semi-insulators at the positions shielded by said grid structure.

9. The structure of claim 8 in which said conducting grid structure is charged to a positive potential.

10. The structure of claim 7 comprising: an insulative grid structure deposited on the outside surface of said second semi-insulator shielding said second semi-insulator from charging by the electron beam except that the openings of said grid structure and preventing the flow off of the impinging electrons through said semi-insulators at the positions shielded by said grid structure.

11. The structure of claim 5 in which said semiconducting substrate is N-type silicon and said insulating layer is silicon dioxide in the order of 2000 to 5000 A units thick.

12. The structure of claim 5 in which said insulating layer overlaying the illuminated surface of said semiconducting substrate lowers the surface recombination of photon-generated carriers under illumination.

13. The structure of claim 1 in which the dopant impurity concentration in said semiconducting substrate varies with position from a high dopant concentration in the area of said semiconducting substrate furthest from said first semi-insulator with decreasing concentration towards said first semi-insulator causing an electric field which drives photoelectrically generated minority carriers towards said depletion layer preventing their surface recombination at the surface of said surface opposite to said first-semi-insulator.

14. The structure of claim 6 in which said semiconducting substrate comprises: channels of one conductivity type separated from each other by at least one region of opposite conductivity type with said channels having an exposed surface in the same plane as one surface of said substrate; a film of at least one semi-insulator overlaying said substrate surface and having a common interface with each channel; and an insulator film which overlays said semi-insulator and contains openings for electric access to said semi-insulator overlaying said channels.

15. The structure of claim 14 in which said means to charge the surface of said semi-insulator comprises: a multiplicity of conducting lines which overlay said insulator and the exposed surface of said semi-insulator and which cross over said channels, together with means to apply in sequence, an electrical potential to each said line.

16. The structure of claim 15 in which the means to pass an electrical signal through said semi-insulator and said channels comprises: an electrical circuit which sequentially establishes the necessary potential on the end surface of each semiconducting channel to form a depletion layer in said channel adjacent to said semi-insulator; said potential depending upon the conductivity type of said channel.

17. The structure of claim 6 in which said semiconducting substrate comprises: channels of one conductivity type separated from each other by at least one region of opposite conductivity type with said channels having an exposed surface in the same plane as one surface of said substrate; a transparent insulative layer of $SiO_2$ in the order of 2000 to 5000 A units thick thermally grown on the surface of said semiconducting substrate faced by said channels, openings in said transparent insulative layer to expose the surface of said channels; a film of at least one semi-insulator overlaying both said transparent insulative layer and the exposed surface of said channels.

18. The structure of claim 17 in which said means to charge the surface of said semi-insulator comprises: a multiplicity of conducting lines which overlay said insulative layer and cross over said channels, together with means to apply in sequence, an electrical potential to each said line.

19. The structure of claim 18 in which the means to pass an electrical signal through said semi-insulator and said channels comprises: an electrical circuit which sequentially establishes the necessary potential on the end surface of each semiconductor channel to form a depletion layer in said channel adjacent to said semi-insulator, said potential depending upon the conductivity type of said channel.

20. The structure of claim 17, including a transparent insulator overlaying the illuminated surface of said semiconducting substrate to lower the surface recombination of photon-generated carriers under illumination.

21. The structure of claim 6, whereby said semiconducting substrate is of uneven thickness, being thinner in positions adjacent to said discretely spaced sensing points.

* * * * *